UNITED STATES PATENT OFFICE.

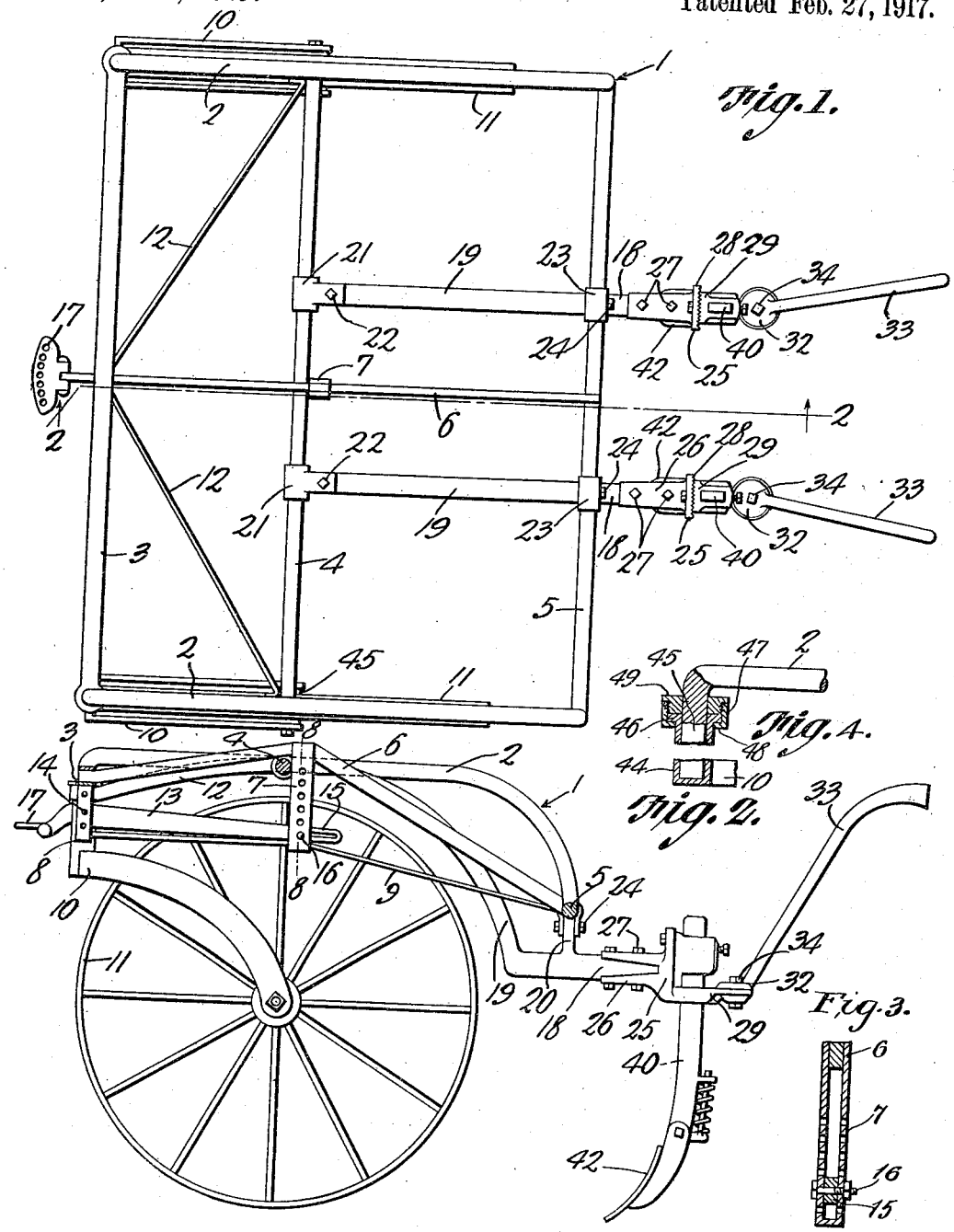

HENRY A. HARRIS, OF ATTOYAC, TEXAS.

CULTIVATOR.

1,217,172.  Specification of Letters Patent.  Patented Feb. 27, 1917.

Application filed October 19, 1915.  Serial No. 56,753.

*To all whom it may concern:*

Be it known that I, HENRY A. HARRIS, a citizen of the United States, residing at Attoyac, in the county of Nacogdoches and State of Texas, have invented a new and useful Cultivator, of which the following is a specification.

The present invention appertains to cultivators, and aims to provide a tongueless walking cultivator, the frame of which is mounted upon casters, so that the frame can be shifted sidewise conveniently by the operator when the rows of plants are uneven or irregular.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of the improved cultivator.

Fig. 2 is a longitudinal section thereof taken on the line 2—2 of Fig. 1.

Fig. 3 is a sectional detail of an adjusting means for the lever.

Fig. 4 is a sectional detail, portions being broken away and others being illustrated in elevation, illustrating the means for pivotally connecting one of the caster forks to the front corner of the frame.

In carrying out the invention, there is employed a metallic or other suitable frame 1 embodying parallel longitudinal side members 2 having their forward ends connected by a cross piece 3. The side members 2 are connected between their ends by an intermediate cross piece 4, and the rear ends of the side members 2 are curved downwardly and are connected by a rear cross piece 5 parallel with the cross piece 4. The frame has a longitudinal angular bar 6 terminally attached to the front and rear cross pieces 3 and 5, respectively, and having its bend secured upon the intermediate cross piece 4. A U-shaped member 7 has its terminals secured to the angle of the bar 6, and a U-shaped member 8 has its terminals secured to the forward end of the bar 6. A longitudinal bar or strip 9 is secured to the bends of the members 7 and 8 and has its rear end attached to the cross piece 5. The bar 9 braces the members 7 and 8.

The frame 1 is carried by a pair of casters embodying forks 10 pivotally connected with the front corners of the frame and caster wheels 11 are mounted for rotation within the forks and adapted to swing under the side members 2 of the frame. It will be noted that the rear portion of the frame is curved downwardly in rear of the wheels 11, and that the forward portion of the frame is raised to allow the wheels to swing thereunder in guiding the frame to one side or the other.

The frame also has oblique braces 12 between the remote ends of the cross piece 4 and the intermediate portion of the cross piece 3.

In order to hitch the draft animal or animals to the frame, a lever 13 is fulcrumed within the member 8 by means of a pin or other pivot element 14, said member 8 preferably having a series of apertures for the reception of the pin 14 whereby the fulcrum of the lever 13 may be adjusted. The lever has a short forwardly projecting arm, and a relatively long rearwardly projecting arm. The free end of the long arm is slotted, as at 15, and works vertically within the member 7, said member 7 having a vertical series of apertures for the reception of a bolt or element 16 extending through the slot 15. By removing the bolt 16, the lever 13 may be adjusted, and the bolt 16 may then be reapplied, the same being passed through the slot 15 and a pair of apertures of the member 7 to hold the lever 13 in place. A clevis 17 is pivoted to the short forward arm of the lever 13 and is adapted for the attachment thereto of a single or double tree. The clevis having a transverse series of apertures enables the draft animal or animals to be hitched to the frame at the center line thereof or at either side of the center line, and the lever 13 may be adjusted so that the draft is properly transmitted to the frame.

A pair of cultivator beams 18 are carried by the frame, the rear portions of said beams extending rearwardly under the cross piece 5, and the forward portions 19 of said beams being offset upwardly so as to extend to the cross piece 4. The rear or lower portions of the beams 18 have upstanding arms 20. U-shaped clips 21 straddle and embrace the cross piece 4 and have their terminals clamped to the forward ends of the beams 18 by bolts 22, and similar U-shaped clips 23 straddle and embrace the cross piece 5 and have their terminals clamped to the arms 20 by means of bolts 24. When the bolts 22 and 24 are tightened, the clips tightly embrace the cross pieces, for holding the beams in place, and when the bolts are loosened, the beams can be shifted transversely either toward or away from one another for purpose of adjustment.

Each of the beams 18 carries a standard at its rear end, and to this end, a casting 25 is provided with split sleeve 26 slipped onto the end of the beam 18, and secured thereto by means of bolts 27. The casting 25 has means for holding the standard 40. The rear or free end of the bracket 29 has pivoted thereon, as at 34, the foot plate 32 of a handle 33. The plate 32 can be loosened, whereby the handle 33 may be held at various angular positions. The handles can thus be adjusted about vertical axes to adjust them closer together or farther apart, according to the adjustments of the beams 18.

Any suitable cultivator blade 42 can be attached to the lower end of the standard 40, the blade preferably being carried by a spring trip foot of ordinary construction.

The handles 33 being attached to the brackets 29 of the casting 25 enable the frame to be shifted conveniently, whereby the cultivator blades will properly work the soil along crooked as well as straight rows of plants. The frame 1 will readily follow the draft animal or animals, and at the same time, it can be shifted sidewise easily by the operator, due to the fact that the frame is carried by the caster wheels.

In order to pivot the caster forks 10 to the frame, each fork 10 is provided with an upwardly projecting socket portion 44 receiving the downturned forward terminals 45 of the respective side member or rod 2, and the upper end of the portion 44 is provided with an outturned annular flange 46. A ring 47 surrounds the flange 46 and is provided with a lower inturned flange 48 below the flange 46, said ring 47 being threaded upon a collar 49 secured to the terminal 45. The flange 46 is upheld between the collar 49 and flange 48, and the portion 44 is rotatably mounted upon the terminal 45 in order that the fork 10 can swing toward one side or the other.

Having thus described the invention, what is claimed is:

A cultivator embodying a frame having a cross piece between its forward and rear portions and another cross piece at its rear portion, caster wheels pivotally connected with the front corners of the frame and movable under the side portions thereof, the rear portion of the frame being curved downwardly in rear of said wheels, the rear cross piece being lower than the first mentioned cross piece, a pair of longitudinal beams below the rear cross piece and having their forward terminals curved upwardly and extending to the first mentioned cross piece, and clips carried by said beams and slidably engaging said cross pieces.

In testimony that I claim the foregoing as my own, I have hereto affixed my signature in the presence of two witnesses.

HENRY A. HARRIS.

Witnesses:
L. L. MOORE,
M. C. FALL.

Copies of this patent may be obtained for five cents each, by addressing the "Commissioner of Patents, Washington, D. C."